United States Patent
Barbaresi et al.

(10) Patent No.: US 7,941,154 B2
(45) Date of Patent: May 10, 2011

(54) METHOD AND SYSTEM FOR RESOURCE MANAGEMENT IN COMMUNICATION NETWORKS, RELATED NETWORK AND COMPUTER PROGRAM PRODUCT THEREFOR

(75) Inventors: Andrea Barbaresi, Turin (IT); Paolo Goria, Turin (IT)

(73) Assignee: Telecom Italia S.p.A., Milan (IT)

( * ) Notice: Subject to any disclaimer, the term of this patent is extended or adjusted under 35 U.S.C. 154(b) by 657 days.

(21) Appl. No.: 11/578,785

(22) PCT Filed: Apr. 19, 2004

(86) PCT No.: PCT/EP2004/004134
§ 371 (c)(1),
(2), (4) Date: Oct. 18, 2006

(87) PCT Pub. No.: WO2005/101880
PCT Pub. Date: Oct. 27, 2005

(65) Prior Publication Data
US 2007/0249359 A1    Oct. 25, 2007

(51) Int. Cl.
*H04W 72/00* (2009.01)
*H04W 74/00* (2009.01)
*H04W 4/00* (2009.01)
*H04B 7/00* (2006.01)

(52) U.S. Cl. ............ 455/451; 455/450; 455/452.1; 455/452.2; 455/455; 455/464; 455/509; 455/510; 370/329

(58) Field of Classification Search ....... 455/450–452.2, 455/455, 464, 509, 510; 370/329
See application file for complete search history.

(56) References Cited

U.S. PATENT DOCUMENTS
5,542,093 A    7/1996   Bodin et al.
5,729,542 A    3/1998   Dupont
(Continued)

FOREIGN PATENT DOCUMENTS
WO    WO 02/32160 A2    4/2002
(Continued)

OTHER PUBLICATIONS
Wikipedia, Grade of Service, May 18, 2009, Wikipedia, 4pages.*
(Continued)

*Primary Examiner* — Huy Phan
*Assistant Examiner* — Munsoon Choo
(74) *Attorney, Agent, or Firm* — Finnegan, Henderson, Farabow, Garrett & Dunner, L.L.P.

(57) ABSTRACT

A method for providing, in a communication network including at least a first and a second set of resources, a service to users of at least a first and a second type. The users of the first type are in a condition to be provided said service only by means of said first set of resources, while the users of the second type are in a condition to be provided said service both by means of the first set of resources and by means of the second set of resources. The method includes the steps of detecting during at least one time interval, the total number of requests for service coming from said users, identifying within the total number the fraction of requests adapted to be met only by means of the first set of resources, identifying at least one parameter representative of said fraction, and providing the service to the users of the second type by means of the second set of resources as a function of the at least one parameter.

42 Claims, 5 Drawing Sheets

U.S. PATENT DOCUMENTS

| | | | | |
|---|---|---|---|---|
| 6,647,275 | B1 * | 11/2003 | Kobernat | 455/553.1 |
| 6,789,203 | B1 * | 9/2004 | Belissent | 726/22 |
| 2005/0213507 | A1 * | 9/2005 | Banerjee et al. | 370/241 |

FOREIGN PATENT DOCUMENTS

| WO | WO 02/32179 A1 | 4/2002 |
|---|---|---|
| WO | WO 02/054677 A1 | 7/2002 |

OTHER PUBLICATIONS

Specification 3GPP TR25.881 ("Improvement of RRM across RNS and RNS/BSS, release 5") (Dec. 2001).

Specification 3GPP TR25.891 ("Improvement of RRM across RNS and RNS/BSS, release 6") (Feb. 2003).

* cited by examiner

Fig_1

Fig_2

Fig_6

METHOD AND SYSTEM FOR RESOURCE MANAGEMENT IN COMMUNICATION NETWORKS, RELATED NETWORK AND COMPUTER PROGRAM PRODUCT THEREFOR

CROSS REFERENCE TO RELATED APPLICATION

This application is a national phase application based on PCT/EP2004/004134, filed Apr. 19, 2004, the content of which is incorporated herein by reference.

FIELD OF THE INVENTION

The present invention refers to communication networks and, more specifically, pertains to methods for resource management in such networks.

DESCRIPTION OF THE RELATED ART

Radio resource management (RRM) methods are performed during normal system operation within network apparatus that manages and controls the radio resources of the cells included in the network.

Among radio resource management methods, common radio resource management (CRRM) methods take into account the possibility of jointly managing radio resources in a "heterogeneous" cellular radio mobile network including, for instance, both the radio access segment of a GSM system and the radio access segment of a UMTS system.

In fact, a heterogeneous cellular network includes different radio technologies and is generally of the "multiple-access" type. This means that the part of the network providing access to the transport segment of the network is implemented by means of two or more systems (and therefore conforms to a plurality of standards).

Within radio mobile cellular systems different technologies and different standards exist. Those systems that are most commonly used today (i.e. the so-called second generation systems such as, for instance, the GSM system) will be increasingly operated in combination with new system types (such as third generation systems, e.g. UMTS, or fourth generation systems, still in the definition phase).

Current, second generation cellular networks are mostly adapted to provide voice services, while the third and fourth generation networks are intended to support, in addition to voice services, a wide variety of new data and multimedia services. It is generally expected that, at least for some years, the new cellular networks will not completely substitute the existing, second generation networks. They will rather integrate existing networks by offering to clients the possibility of using new types of services in addition to the standard voice service. Integration is made possible by the characteristics of the new standards: in fact these new standards were defined in such a way to permit operation in a joint and synergic manner with existing cellular networks.

For instance, within the 3GPP standard that defines the characteristics of the UMTS system, various procedures are defined that permit inter-working with the GSM network.

Specifications such as 3GPP TR25.881 ("Improvement of RRM across RNS and RNS/BSS, release 5") and 3GPP TR25.891 ("Improvement of RRM across RNS and RNS/BSS, release 6") define functional models and network architectures that permit application of CRRM methods.

When a certain type of service is requested, which is adapted to be provided both via the GSM network and via the UMTS network, the possibility exists of selecting which system is to be used to meet the specific request. Similarly, it is possible to transfer a service already being provided from a system to another, when this is necessary or advisable. Additionally, terminals (cellular telephones) are already available commercially of the so-called "multi-mode" type. These terminals may operate indifferently by using different systems belonging to different standards. Exemplary of these multi-mode terminals are GSM/UMTS terminals that can use indifferently both the GSM network and the UMTS network.

Within such a context, the problem arises for a "multi-mode" operator (that is an operator operating, for instance, both a GSM network and a UMTS network) to maximize the overall efficiency in exploiting the whole system. For that reason, the need arises of providing arrangements for a common management of radio resources (CRRM) that can define, depending on the type of service requested by the user, the policy to adopt for selecting the more or most suitable system (in fact, the systems/standards involved may be more than two) to achieve a given efficiency target.

For instance, the UMTS standards specifies the procedures and criteria to be used in selecting the UMTS or the GSM system for providing a service requested by a user equipped with a multi-mode terminal. However, the standard does not indicate any specific criteria for common management of the radio resources: in fact, these have the ultimate responsibility of selecting the system to be used among those available.

It will thus be appreciated that, when taking advantage of the inter-working tools available with the various standards, a number of different criteria and policies may be adapted for managing a "multi-access" network.

Certain known arrangements define quite general methods for selecting one system in the place of another. This may occur (see WO-A-02/32160) on the basis of a pre-defined priority list associated with the various cases likely to occur. Alternatively, the possibility exists of adopting a pre-defined choice criterion that may be varied depending on the characteristics of the system selected.

A somewhat similar arrangement is disclosed in WO-A-02/32179, wherein a list of candidate cells for selection (provided as an input) is ordered based on priority criteria.

Additionally, in WO-A-02/054677 an arrangement for telecommunication service provision in a multi-network wireless telecommunication system is disclosed. A primary local network (whose exploitation is not subject to billing) is exploited jointly with one or more public networks. The public networks are considered as secondary systems that are accessed when the local network is not available or is not in a position to ensure an adequate level of quality for the service requested.

The prior art arrangement considered in the foregoing are essentially static arrangements, in that they only take into account the characteristics of the service requested and the status of the network at the time request for a service is made.

Such an approach tends to be rather unsatisfactory in all those situations where the system to be used is to be selected among a set of systems that may not be simultaneously available whenever a request is made.

The changes in the number and types of the systems out of which the choice is to be made may be due, for instance, to the various systems having different coverage areas depending on their specific characteristics. For instance, a wireless LAN may cover just a very small area (a so called "hot-spot"), while a single cell of either a GSM or UMTS system is generally adapted to cover a much larger region. Alternatively, requests for service may well come from terminals including both single-standard and multi-standard terminals.

However, no choice of standard/system is possible for a service request from a single-standard terminal.

OBJECT AND SUMMARY OF THE INVENTION

The object of the present invention is thus to overcome the drawbacks of prior-art arrangements as defined in the foregoing.

According to the present invention that object is achieved by means of a method having the features set forth in the claims that follow. The invention also relates to a corresponding system, a related network as well as a related computer program product, loadable in the memory of at least one computer (e.g. a processor such as a microprocessor) and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention is thus a method for providing, in a communication network including at least a first and a second set of resources a service to users of at least a first and a second type. The users of the first type are in a condition to be provided said service only according to the first set of resources while the users of the second type are in a condition to be provided the service both by means of the first set of resources and by means of the second set of resources. During at least one time interval, the total number of requests for the service coming from the users is detected along with the fraction of requests adapted to be met only by means of the first set of resources. At least one parameter representative of said fraction is identified and the service is provided to the users of the second type by means of the second set of resources as a function of the parameter in question.

In a typical context of use, the first and second set of resources correspond to two different communication standards such as e.g. GSM, UMTS. In that case, the first and second types of users are primarily identified based on their capability to operate according to just one standard (e.g. GSM) or according to two or more standards (e.g. GSM/UMTS "multistandard" terminals). Preferably, the fraction referred to in the foregoing is thus identified by including in the fraction also requests coming from users of the second type (GSM/UMTS) that cannot be temporarily met by means of the second set of resources (e.g. the UMTS network): this may occur, for instance, because a multimode GSM/UMTS terminal is temporarily out of the coverage area of the UMTS network.

Alternatively, the first and second set of resources may correspond to two different cell layers of the same cellular communication standard, whereby said first and second types of users are identified based on coverage by said two different cell layers.

In the presently preferred embodiment, the invention defines a new approach to the choice criteria underling operation of a CRRM system which also takes into account the possible different scenarios encountered by subsequent requests for service.

Specifically, the arrangement described herein is in the position of selecting the system more or most adapted to provide a given service by minimizing the overall block probability, namely the possibility that, in the presence of a request for service, the network as a whole is not in a position to meet the request due to the unavailability of resources.

For instance, when the choice is to be made between GSM and UMTS systems for providing a voice service, the arrangement described herein is in the position to consider that, out of the various requests, certain requests can be met both via the GSM system and via the UMTS system, while other requests can be met only by means of the GSM system. This may occur, for instance, since the terminal requesting the service is in a position to use the GSM system only, or because the area from which the request is made is covered only by the GSM system. The arrangement described herein takes into account the characteristics of the various requests received and applies an adaptive threshold (based on a forecast of expected future requests) to be used within the selection method.

A basic advantage of the arrangement described herein lies in that the resulting performance level is remarkably better than the performance level reached by using general methods already known in the art, whose operation is dictated solely by the characteristics of a single request to be met at the moment.

By analysing the various requests for service arriving over a time interval, the arrangement described herein is in a position to self-adapt to possible changes of traffic conditions and characteristics over time.

Essentially, within the framework of a "multi-access" radio mobile network, the arrangement described herein adopts selection criteria that, in addition to the "instantaneous" conditions of the network and the characteristics of the specific service request to be met, also take into account a forecast of the differences likely to exist in the various future requests for service.

BRIEF DESCRIPTION OF THE DRAWINGS

The invention will now be described, by way of example only, by referring to the enclosed figures of drawing wherein.

DETAILED DESCRIPTION OF PREFERRED EMBODIMENTS OF THE INVENTION

Figure 1:
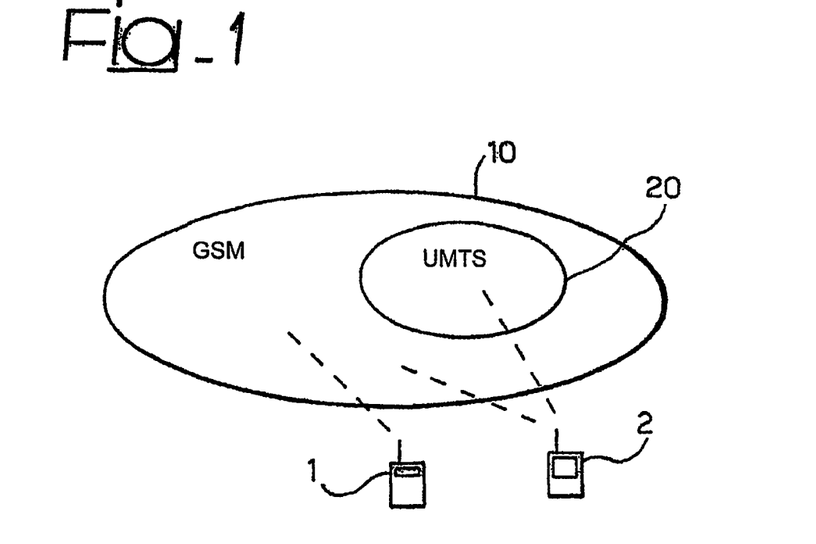
FIG. 1 portrays an exemplary reference scenario of application of the arrangement described herein.

FIG. 1 shows a possible scenario for application of the arrangement described herein.

Specifically, in FIG. 1 reference 10 indicates a territory area service by a first system (i.e. a first set of communication resources such as a GSM system), while a sub-area 20 of the same region is also served by a second system (i.e. a second set of communication resources such as a UMTS system).

As indicated in the foregoing, this is just an exemplary context of use of the arrangement described herein, where the first and second set of resources correspond to two different communication standards such as e.g. GSM, UMTS. In that case, the first and second types of users are primarily identified based on their capability to operate according to just one standard (e.g. GSM) or according to two or more standards (e.g. multistandard GSM/UMTS terminals).

As a possible alternative context of use, the first and second set of resources may correspond to two different cell layers of the same cellular communication standard, whereby said first and second types of users are identified based on coverage by said two different cell layers.

Turning specifically to the exemplary GSM/UMTS context considered here, it is sensible to assume that the UMTS coverage area 20 may be either a subset of or—at most—coincide with the GSM coverage area. The further possibility, namely the UMTS coverage area being larger than the GSM coverage area is highly unlikely to occur.

Additionally, it will be assumed that within the coverage area of the two systems considered, two types of terminals 1 and 2 co-exist.

Terminals 1 are "single-mode" terminals, namely terminals adapted to use only the GSM system. Conversely, the terminals 2 are of the "dual-mode" type adapted to use both the GSM system and the UMTS system.

Those of skill in the art will promptly appreciate that the scenario portrayed in FIG. 1, is merely exemplary in its nature.

In fact, the arrangement described in the following is generally adapted to operate in a scenario where two or more systems co-exist (for instance, in addition to a GSM system and a UMTS system, a wireless LAN comprising a so-called "hot-spot").

The description that follows refers to (only) two co-existing systems, namely a GSM system and a UMTS system, primarily for the sake of simplicity and ease of understanding.

Figure 2:
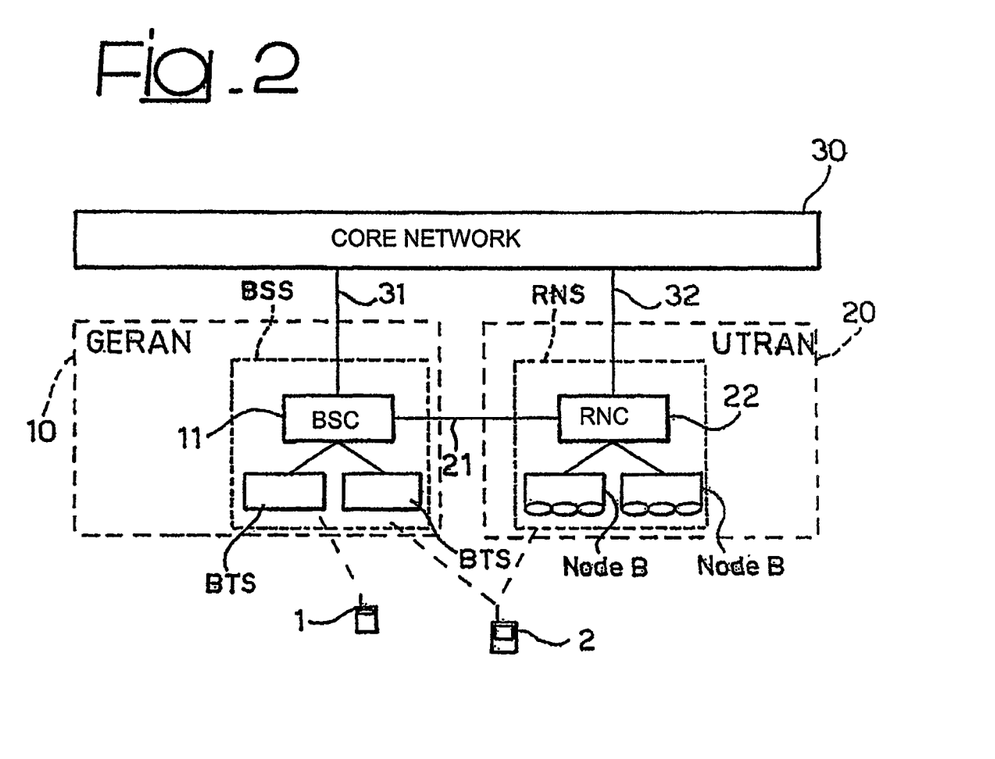
FIG. 2 is a block diagram of an exemplary architecture of a network suitable for application of the arrangement described herein.

Specifically, in the block diagram of FIG. 2 the possibility is shown for the single-mode GSM terminals 1 to access a corresponding radio access network currently designated GERAN (GPRS-EDGE Radio Access Network) 10. A GERAN network is generally adapted to be used by any of a GSM/GPRS/EDGE system.

While the terminals 1 may access the GERAN network 10 only, the dual-mode or multi-mode terminals 2 can access both the GERAN network 10 and the respective access network 20 designated UTRAN (Universal Terrestrial Radio Access Network), as used by UMTS systems.

Reference numeral 30 designates the core network that is interconnected with the GERAN access network via an interface 31 and with the UTRAN access network 20 via an interface 32.

The network device or apparatus controlling the radio resources of the GSM system, namely the BSC (Base Station Controller) 11 and the homologous network device or apparatus controlling the radio resources in the UMTS network, namely the RNC (Radio Network Controller) 22 are configured to exchange information via the core network 30.

Alternatively, an interface 21 can be provided to permit direct communication between the BSC 11 and the RNC 22. The specific procedures detailed in the following can advantageously reside and be implemented in the BSC 11 and the RNC 22.

Finally, the radio base stations for the GSM system and their homologous stations for the UMTS system are indicated by their current acronyms namely BTS and Node B.

The sets comprised of the BSC and the BTSs are designated a whole BSS (Base Station System). The homologous set for the UMTS system is designated RNS (Radio Network Subsystem).

Figure 3:
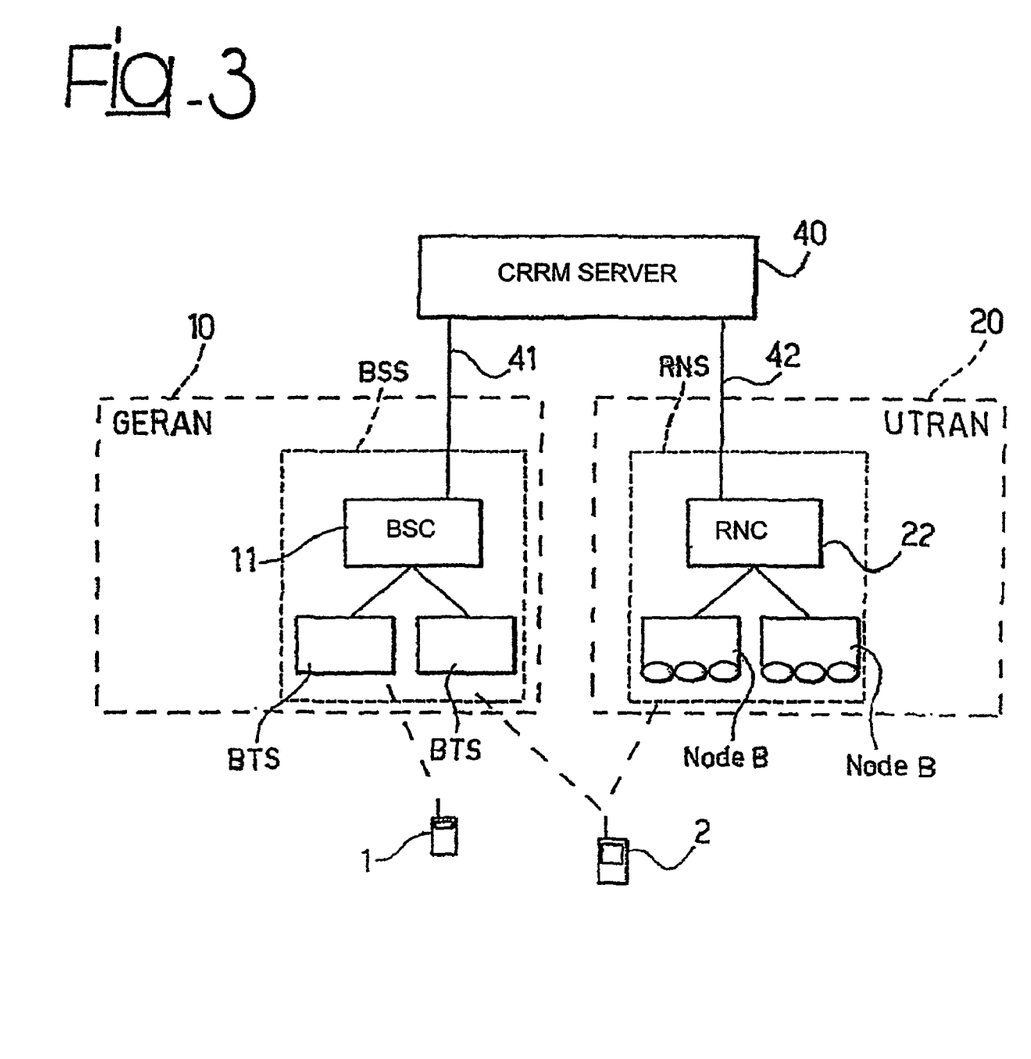
FIG. 3 is a block diagram of a further possible architecture of the arrangement described herein.

In the diagram of FIG. 3 elements/components identical or equivalent to those already described in connection with FIG. 2 have been designated with the same references.

Specifically, the diagram of FIG. 3 shows a possible alternative arrangement of the invention, wherein the procedures better detailed in the following are hosted and are performed within a network device 40 designated Common Radio Resource Management (CRRM) server.

The CRRM server 40 requests information on the GSM cells to the BSC 11 via an interface 41. Similarly, it acquires information on the UMTS cells to the RNC 22 via the interface 42.

Those of skill in the art will promptly appreciate that the architectures shown in FIG. 2 and FIG. 3 are both adapted to support a CRRM procedure. It will thus be appreciated that, irrespective of the architecture selected (the one shown in FIG. 2, or the one shown in FIG. 3) the arrangement described herein thus does not require any specific implementation or requirement beyond those currently provided by the present version on UMTS standard and the expected subsequent revisions.

From the viewpoint of the user requesting a service that can be provided by either system, such as e.g. a voice service, no specific reasons exist for giving preference to either of the GSM or the UMTS system.

Conversely, from the viewpoint of the network operator, being in a position to control the number of users served by one system in the place of the other may be significant in order to exploit efficiently the whole multi-standard system, by minimising the block probability, namely the possibility that requests for service may be negated due to unavailability of the necessary resources.

The UMTS system differs from the GSM system in that the UMTS system is in a position to provide service such as data and multi-media services in addition to the standard voice service provided by GSM.

Consequently, in the case of requests for a voice service, and given the same block probability, it will be generally preferable for an operator to use the GSM system more extensively than the UMTS system. In that way, the network resources of the UMTS system may be kept available for use in an economically advantageous way to provide new services, especially in the case these latter services are regarded as more economically rewarding.

A general advantage will thus exist in steering the choice for the system used to provide a voice service in such a way as to minimise the block probability for the service while simultaneously giving the GSM system priority over the UMTS system for that kind of service.

In practice, three different cases of requests for service may occur within the scenario introduced in the foregoing, namely:

case 1: voice service requested by a single-mode terminal 1, case 2: voice service requested by a multi-mode terminal 2 located at a point covered by the GSM system only, and case 3: voice service requested by a multi-mode terminal 2 located at a point covered both by the GSM system and the UMTS system.

In the two first cases considered, the choice for the system is compulsory, even though for different reasons. In fact, the GSM system is to be inevitably used since using the UMTS system does not represent a feasible option: this is either because the terminal requesting the voice service is not able to use the UMTS system or because the dual-mode terminal requesting the service (which by itself could be adapted to use the UMTS system) is located at a point served by the GSM system only.

Consequently, only the third case above is in fact open to selection, i.e. deciding whether the voice service is to be provided by the UMTS system as an alternative with respect to GSM system. This is because the request for service comes from a dual-mode terminal 2 located at a point covered both the GSM system and the UMTS system.

Significantly, even though the selection is required only in the third case, the arrangement described herein performs selection in such a way to minimize the block probability associated—as a whole—to request for a voice service, that is by taking into account that also the first two cases considered occur with a given frequency.

Both arrangements described in the foregoing may exploit the knowledge of the frequency of occurrence of the first two cases considered in the foregoing.

The probability of cases 1 and 2 is expressed by means of the parameter designated P.

This can be seen as the fraction (e.g. percentage) of requests for service that—by way of necessity—are to be allocated to a given system (for any reason) and cannot be allocated to the other system(s).

The probability P may take values included in the interval 0 to 1.

Essentially, the procedures detailed in the following use that parameter to select the more or most appropriate system to meet a certain service request. For that reason the procedures in question estimate that parameter, together with its variations by monitoring the requests for service over time.

Figure 4:
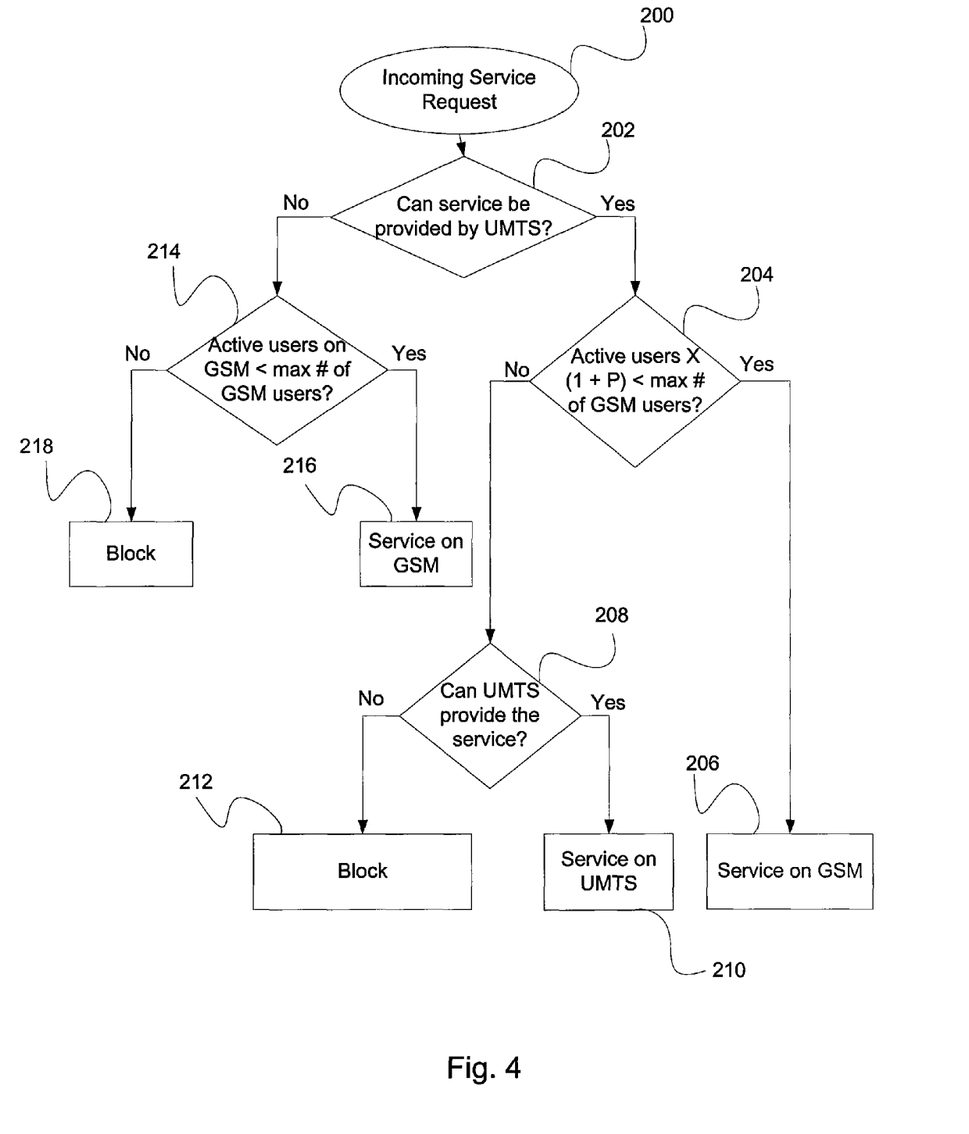
FIGS. 4 to 6 are flowcharts representative of procedures adapted to be implemented within the framework of the arrangement described herein.

A first procedure for that purpose is shown in FIG. 4.

Specifically, the procedure represented by the flowchart of FIG. 4 is adapted to be implemented (in the case of the network architecture of FIG. 2) within the network controllers BSC 11 (GSM system) and RNC 22 (UMTS system).

More in detail, within the BSC 11, the procedure can be performed without any need for the BSC 11 to request information from the RNC 22. For that reason, such a procedure can be implemented in the current release for the UMTS system, without any modifications. Within the RNC 22 the procedure can be implemented provided the RNC 22 may obtain from the BSC 11 the number of the users active on the GSM cell which is the subject matter of the choice.

Those of skill in the art will appreciate that the possibility for the BSC 11 and the RNC 22 to exchange information on the loads of the cells controlled thereby is provided starting from the release 5 of the UMTS standard.

Alternatively, the procedure represented by the flowchart of FIG. 4 can be implemented in the network architecture of FIG. 3 within the CRRM Server 40. In that case, the information on the load of the GSM cell subject to the selection is obtained via the interface 41.

Specifically, in FIG. 4, reference 200 represents an incoming request for a voice service.

In a step 202, the system checks whether the service can be provided by the UMTS system.

In the positive, in a further step 204 a check is made as to whether the number of active users in the cells times the factor (1+P), where P is the probability parameter considered in the foregoing, is lower than the maximum number of GSM users for that cell.

In the positive, in a step 206, the service is allocated to the GSM system.

If the check in a step 204 yields a negative outcome, in a step 208 a check is made as to whether the UMTS cell has sufficient resources available and free to provide the service requested.

In the positive, the service is allocated on the UMTS system in a step 210.

If the check in the step 208 yields a negative outcome, the request for service is blocked in a step 212.

If the check in step 202 indicates that the service requested cannot be provided by the UMTS system, in a step 214 a simple check is made as to whether the number of users active on the GSM cell (usually the new user requesting service is not included in the count) is lower than the maximum number of the users allotted for the GSM cell in question.

If the check yields a positive result, the new request can be served and the service is allocated onto the GSM service in a step 216.

If the check in the step 214 yields a negative result (i.e. the number of users already active on the GSM cell is equal to the maximum number admissible), the new request for service is blocked in a step 218.

Those of skill in the art will promptly remark that the arrangement just disclosed can be easily implemented within the architectures of FIG. 2 or 3 without any modifications in the previsions of the latest releases for the UMTS standard. For instance, the system is effectively in the position to perform the check in the step 202 (namely the possibility of providing the service via the UMTS system) as the necessary information is known and provided by the procedures that regulate operation of the system. Additionally, the same standard provides for the possibility that the terminal may exchange with the network a set of information items concerning its capabilities and operating options ("UE capabilities").

Exchange of the information concerning the terminal may take place independently of the type of the system (GSM or UMTS) to which the terminal is connected at the moment the request for service is made. Both the network controller of the UMTS system (namely the RNC 22) and the network controller of the GSM system (the BSC 11) are thus in the condition of ascertaining whether the terminal requesting the voice service is of the single-mode type (terminal 1) or of the dual-mode type (terminal 2).

Additionally, if the request for the voice service comes from a dual-mode terminal 2, the network may request the terminal 2 to perform measurements concerning the radio quality concerning the alternative system (so-called "inter-system measurement").

These measurements are subsequently reported to the network (via the procedures included in the standards for that purpose). Consequently, the possibility exists of ascertaining whether, at the instant of time where a service requested, the terminal is located at a point covered also by the alternative system, so that the possibility of selecting between different systems is a given to the CRRM procedure.

An exemplary implementation of the procedure shown in FIG. 4 can be described by refering to a situation where the maximum number of (voice) users admitted for the GSM cell involved with the selection step is equal to 20 and the probability P is equal to 0.4.

In that case, the check expressed by the step 204 corresponds to checking whether the number of active users is lower than 20/(1+0.4), that is lower than 14.28.

Consequently, as long as the number of active users in the GSM cell is lower than 15, the network allocates onto the GSM cell both those calls that are adapted to be served by the GSM system only (negative outcome of the step 202) as well as those request for services that could also be served by the UMTS system (positive outcome of a step 3, followed by the positive outcome of the step 204).

Conversely, when the number of users on the GSM cell is higher than or equal to 15 the requests for services possibly adapted to be met also by the UMTS system (positive outcome of the step 202) are directed toward the UMTS system (negative outcome of the step 204) followed by the step 208 and the step 210 unless the check in the step 208 yields a negative outcome. In that latter case the request for a service is blocked (step 212).

Figure 5:
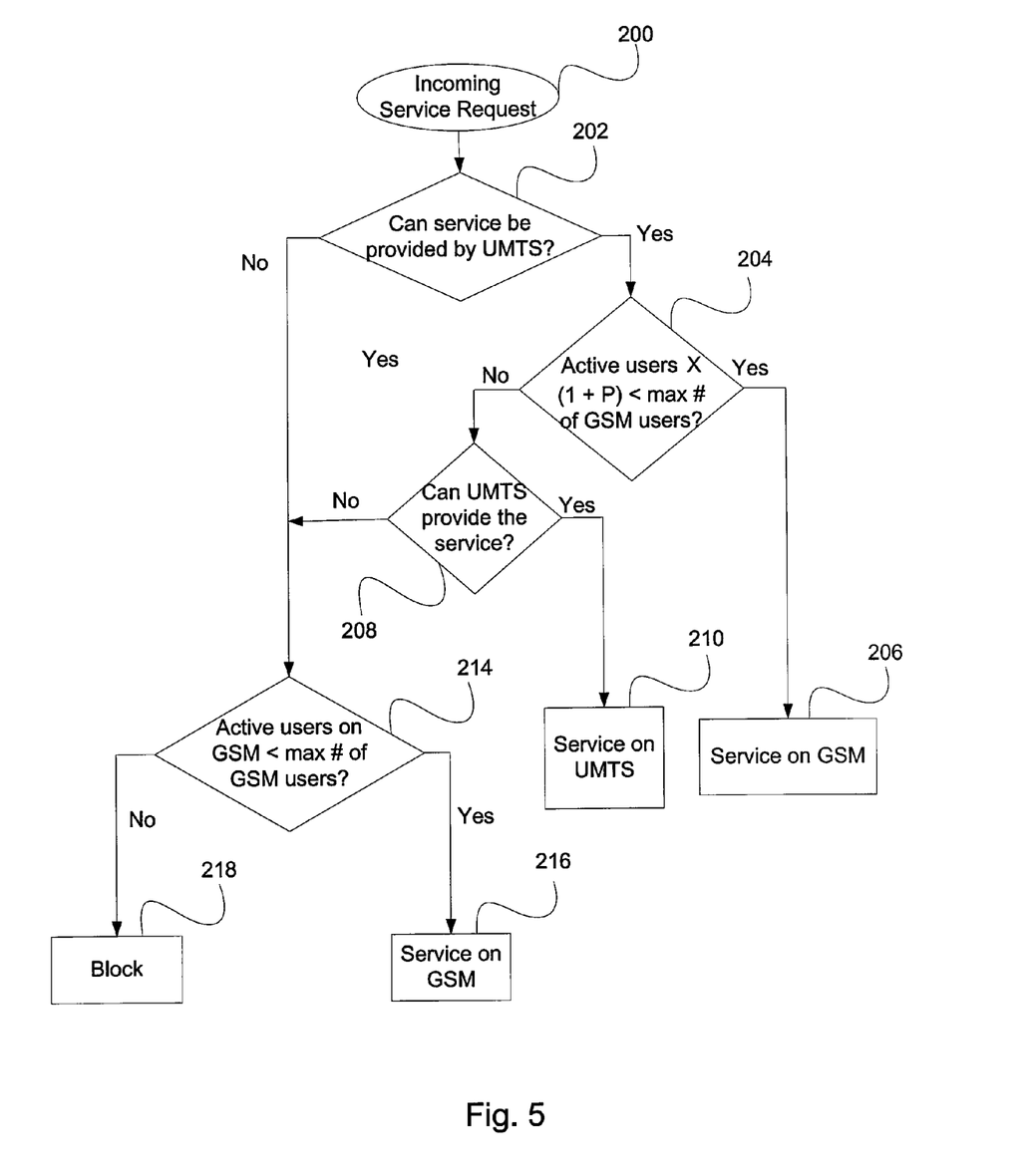

Essentially, the procedure shown in FIG. 5 is a variant of the procedure shown in a FIG. 4 based on a slightly "simplified" arrangement. Essentially, steps of identical or equivalent contents have been indicated by the same reference numerals in both FIGS. 4 and 5.

It will therefore be appreciated that, in the procedure shown in FIG. 5, the negative outcome of the step 208 (the UMTS cell has no available resources free to provide the service requested) does not lead immediately to the request for service being blocked (as is the case of the procedure of FIG. 4—see step 212).

In the procedure of FIG. 5, the negative outcome of the step 208 causes the system to evolve upstream of the step 214, namely to a check if the service (that would be negated due to the unavailability of the resources of the UMTS system originally selected as a result of the positive outcome of the step 202 and the negative outcome of the step 204) can still be provided by the GSM system, which was originally discarded.

The procedure shown in FIG. 5 is similarly adapted to be implemented within the network architecture of FIG. 2 in the network controllers of the GSM system (namely the BSC 11) and the network controllers of the UMTS system (namely the RNC 22).

In comparison with the procedure shown in FIG. 4, the procedure—in order to be carried out correctly within the BSC 11—must receive from the RNC 22 the information concerning the load of the UMTS cell considered.

In fact, in order to perform the step 208 in FIG. 5, the BSC must be in the position of evaluating the availability of free resources in the UMTS cell to possibly meet the requirement for a new service.

It will be appreciated that this is not the case for the procedure shown in FIG. 4: there, when the condition 204 is not met, the request for service is immediately re-directed toward to the UMTS system (so-called "directed retry") being blocked in the case no resources are available in the UMTS system.

Consequently, in the procedure shown in FIG. 5, the GSM system is selected both when the condition 204 is met (step 206) and also when such a condition is not met and no resources are available in the UMTS system to satisfy the request (step 216).

The procedure shown in FIG. 5 is more efficient than the procedure shown in FIG. 4. However, a correct implementation of the procedure of FIG. 5 within the BSC requires that the BSC receives from the RNC information on the load of the UMTS cell.

As for the rest, the procedure shown in FIG. 5 can be implemented within the RNC 22 provided the RNC 22 may request and obtain from the BSC 11 the number of the users that are active on the GSM cell, such information being used in the step 204.

Those of skill in the art know that the possibility for the BSC 11 and the RNC 22 to exchange information on the load of the cells controlled thereby is provided in the UMTS standard starting from release 5 thereof.

As an alternative, the procedure of FIG. 5 can be used within the network architecture of FIG. 3 by the CRRM server 40. In this latter case, information concerning the load of the GSM cell and the resources available in the UMTS cell are derived via the interface 41 and the interface 42.

By referring to the same exemplary operating conditions considered in the foregoing (maximum number of voice users in the GSM cell equal to 20 and P equal to 0.4), operation of the procedure shown in FIG. 5 is as follows.

As long as the number of the user in the GSM cell is lower than 15, the procedure allocates on the GSM cell both those calls than can be served only by the GSM system (negative outcome of the step 202), and those calls that could be also served by the UMTS system (positive outcome of the step 202 followed by negative outcomes in both the step 204 and 208).

When the number of the active user on the GSM cell is higher or equal to 15, the requests for service that could also be served by the UMTS system are re-directed toward the UMTS system provided the resources to meet the request are available and free (positive outcome of the step 202, negative outcome of the step 204 and positive outcome of the step 208).

Differently from the procedure shown in FIG. 4, when the UMTS cell has no available resources free for service (negative outcome of the step 208), instead of being blocked (as is the case of the procedure of FIG. 4), the request is met by the GSM system, provided the corresponding resources are available (positive outcome of the step 214).

Both procedures shown in FIGS. 4 and 5 are based on the availability of the parameter P that is used in the step 204.

In the arrangement described herein, the parameter P represents the probability or fraction (frequency normalized to one) of the requests for voice service received from single-mode terminals 1 (referred to in the foregoing as case 1) or from dual-mode terminals 2 that, at the moment the service is requested, are located at a point covered by the GSM system only (referred to in the foregoing as case 2).

Instead of operating with a fixed value provided as an input by network operator (by means of the so-called operation and maintenance system) the arrangement described herein evaluates/estimates such parameter, namely the parameter P.

First of all, the estimation of the parameter P dispenses with the need for the network operator of configuring in a detailed manner the value to be used: it will be appreciated that such value should be preferably defined in a different manner for each cell of the system.

Additionally, no need exists for the operator to update such value/values since the system itself takes care of continuously updating the parameter P and is thus always in the position to use an updated value experimented during the latest stages of operation of the network.

Figure 6:
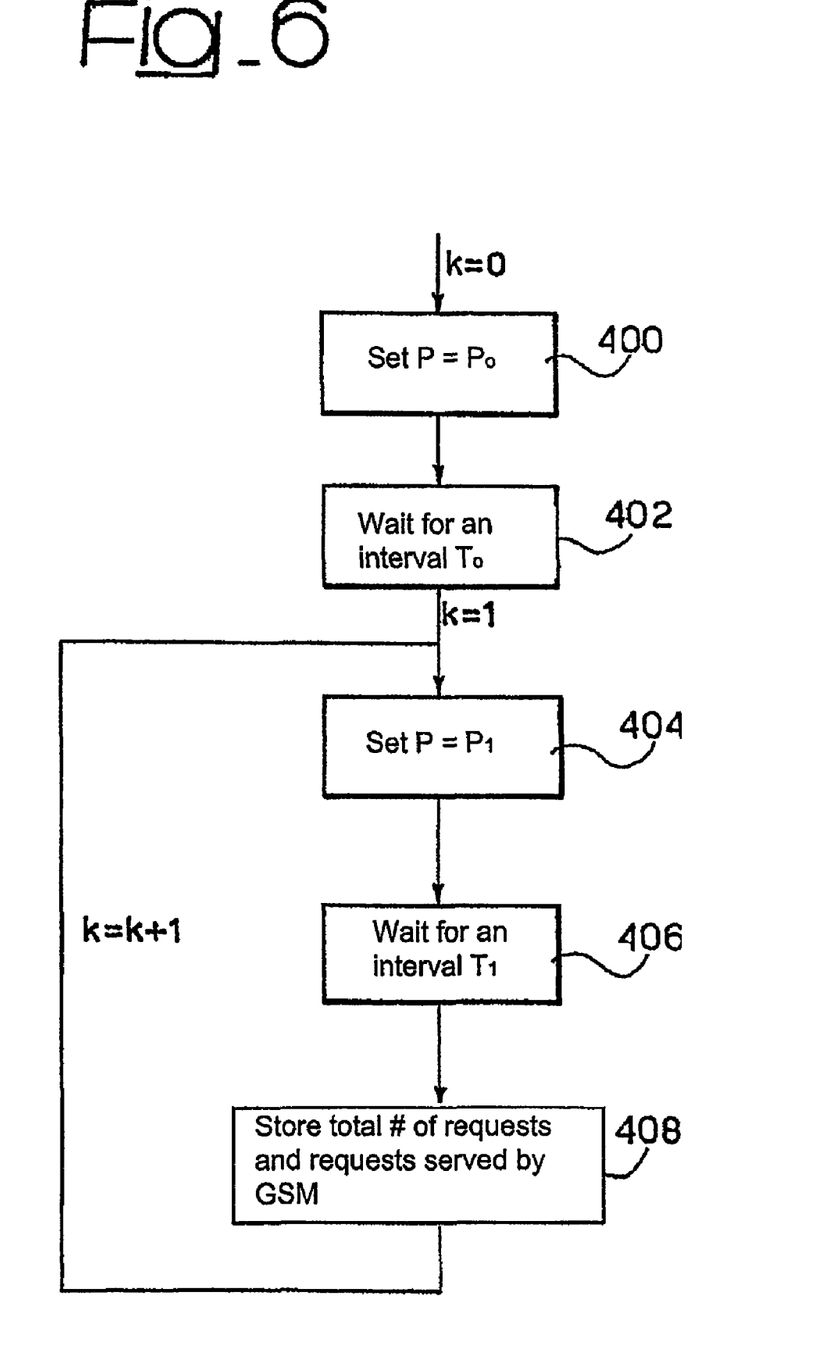

An exemplary approach for determining the value for the parameter P is represented by the flowchart of FIG. 6.

In a first step 400, the parameter P is set to a starting value namely $P_0$.

The step 402 represent a waiting step (for an interval $T_0$ given as an input value), wherein the whole number of requests for service $n_0^{TOT}$ is recorded by identifying the number (fraction) of those requests ($n_0^{(1, 2)}$) that can be served only by the GSM system (negative outcome of the step 202).

After expiration of the interval $T_0$, in a step 404 the value for the parameter P is adjourned to a new value $P_1$ based on the formula:

$$P_1 = a\, P_0 + (1-a) n_0^{(1,\,2)}/n_0^{TOT}$$

where a is weight coefficient provided as an input data (with a included in the interval 0 to 1).

Subsequently, in a step 406 a new value for a waiting interval $T_1$ is computed as follows:

$$\text{if } n_0^{(1,\,2)}/n_0^{TOT} > \text{delta1} \cdot P_0 \text{ then } T_1 = 1.5\, T_0$$

$$\text{if } n_0^{(1,\,2)}/n_0^{TOT} < \text{delta2} \cdot P_0 \text{ then } T_1 = 0.5\, T_0$$

$$\text{if delta2} \cdot P_0 < (n_0^{(1,\,2)}/n_0^{TOT} < \text{delta1} \cdot P_0 \text{ then } T_1 = T_0$$

where delta1 and delta2 are two values provided as an input (both selected in the interval 0 to 1).

If the value for $T_1$ is higher than threshold value $T_{max}$ (which is provided as input data) or lower than another threshold value ($T_{min}$), $T_1$ is set equal to $T_0$.

During a further waiting period, identified by step 408 in FIG. 6, the total number of requests and the number of requests adapted to be served by the GSM only are stored and, after the waiting period $T_1$ is completed, a new step is performed.

In general terms, during the k-th step in the algorithm described a new value $P_k$ for P is computed in the step 404 based on the general formula:

$$P_k = a P_{k-1} + (1-a) n_{k-1}^{(1,2)} / n_{k-1}^{TOT}$$

where $n_{k-1}^{(1,2)} / n_{k-1}^{TOT}$ represents the ratio of the number of requests for service concerning the first two cases (services adapted to be rendered by the GSM system only) to the total amount of requests during the observation period just elapsed. This is, again, the fraction the number of requests for service concerning the first two cases (services adapted to be rendered by the GSM system only) over the total amount of requests.

The new value for the waiting period calculated at the generic step k, designated $T_k$ is a computed starting from the value of the waiting period just expired based on the following relationships:

if $n_{k-1}^{(1,2)} / n_{k-1}^{TOT} >$ delta1 $\cdot P_{k-1}$ then $T_k = 1.5\ T_{k-1}$ if $n_{k-1}^{(1,2)} / n_{k-1}^{TOT} <$ delta2 $\cdot P_{k-1}$ then $T_k = 0.5\ T_{k-1}$ if delta2 $\cdot P_{k-1} < (n_{k-1}^{(1,2)} / n_{k-1}^{TOT} <$ delta1 $\cdot P_{k-1}$ then $T_k = T_{k-1}$ If the value for $T_k$ is higher than threshold value $T_{max}$ (which is provided as input data) or lower than another threshold value ($T_{min}$), $T_k$ is set equal to $T_k$.

Consequently, the value for P is updated by taking into account the speed of evolution of the process represented by the incoming request for services.

Specifically, the waiting or observation period is "modulated" by making it alternatively longer ($T_k = 1.5\ T_{k-1}$) or shorter ($T_k = 0.5\ T_{k-1}$) depending on whether the number of requests adapted to be served by the GSM system only, normalized to the total number of request for services, exceeds an upper threshold (delta1 $\cdot P_{k-1}$) or follows below lower threshold (delta2 $\cdot P_{k-1}$), both thresholds being thus preferably dependent of the value for P estimated over the previous period of observation.

Conversely, the duration of the waiting period is kept unchanged if the value in question remain between the two thresholds.

Essentially, the rationale behind "modulating" the duration of the observation period $T_k$ is to maintain the ratio $n_k^{(1,2)} / n_k^{TOT}$ within a reasonable range.

While the exemplary arrangement described herein refers to a basic scenario including a GSM system and an UMTS system comprising a single integrated radio mobile network, the invention is adapted for use in all those situation where two or more access networks characterised by different standards are used as a single network.

It will be appreciated that the underlying principle of the invention is in no way related either to the GSM standard or to the UMTS standard. The arrangement described herein is adapted for use in all those scenarios where the various systems considered directly or indirectly provide for a maximum limit of the number of users of a given service that can be managed with the network resources available (step 204 FIGS. 4 e 5).

This is the case of a real situation where, generally, various radio mobile systems have an amount of network resources that is—by way of necessity—limited.

Depending on the specific standard considered, the limit is given by the specific transmission techniques adapted and the various parameters involved.

For instance, each cell in a GSM system has a maximum number of voice circuits, which is set when the system is dimensioned. Conversely, in a UMTS system the limit may be given, depending on the cases, either by the maximum interference level that the system may manage with the power levels available or by the number of codes that can be used to identify the users.

In other systems (for instance in the case of an area served by a WLAN hot-spot) the maximum number of users for a given service can be determined based on the minimum level of quality of service (QoS) offered to the users. For instance, one may set a minimum limit value for the data transfer rate intended to be offered to each of the users. Alternatively, a maximum value can be set for the acceptable transfer delay.

The exemplary criterion expressed in the step 204 of FIGS. 4 e 5 corresponds in general to the basic condition based on which the amount of network resources required in order to support a number of users equal to the number of active users multiplied by (1+P) must be lower or equal to the maximum amount of the network resources made available as a whole by the system cell.

This general condition may be translated in the most suitable way depending on the specific system considered.

Once again it is recalled that the arrangement described herein can be advantageously applied to networks including a single access system, wherein two (or more) hierarchically arranged cell layers co-exist.

As is well known, in mobile radio networks, such hierarchically arranged cell structures are designated with the acronym HCS (Hierarchy Cell Structure). A single system where at least two different layers co-exist (e.g. in the form of "macro" and "micro" cells) can in all respects be regarded as a heterogeneous system. There the problem arises of commonly managing the radio resources of the cells belonging to the two layers. In fact these cells are characterised by different (partly superposed) coverage areas and different radio resources.

Also in that case the possibility exists of using the procedures described herein in order to identify the more or most suitable layer to provide a given service. In that case the concept of a network whose heterogeneous nature is given by the different Radio Access Technologies (RATs) co-existing within the network is substituted by the concept of a network which is heterogeneous in view of the different hierarchically arranged cell layers. In this latter case, the first and second set of resources that were identified in the exemplary embodiment described herein by two co-existing GSM and UMTS systems, will correspond to two different cell layers of the same cellular communication standard, whereby the first and second types of users (1 and 2) will be identified based on coverage by said two different cell layers.

Additionally, those of skill in the art will promptly appreciate that referring to a voice service as to the service being requested and allocated either on a GSM system or on an UMTS system is of purely exemplary nature.

The arrangement described herein can in fact be applied also to other types of service. Depending on the specific service considered (and its characteristic in term of quality profile to be guaranteed) one may determined the minimum quantity of network resources to be allocated for each service user when a specific system is used.

Consequently, in general terms, whenever a given service can be provided via two (or more) different radio access networks, and any reasons exist that may lead to prefer a specific system with respect to others, the arrangement described herein can be used to advantage. Certain arrangements are adapted to take into account the possibility that in certain cases the preferred system is in fact the only system available (at least at the moment) whereby, generally speaking, there is no absolute convenience in waiting for the maximum level of users being reached in one system before selecting an alternative system. For all these cases, the arrangement described tends to maximize the exploitation of the most suitable system without however excluding recourse to the alternative system, when this is advantageous (and not merely necessary).

In the exemplary arrangement described, the GSM system is generally preferred to the UMTS system for providing the voice service, since the GSM system has been specifically devised for supporting the voice service, while it is not adapted to provide other services with the same criteria and the same efficiency of the UMTS system.

Such a policy may bring a number of advantages with itself: first of all, it offers the possibility of exploiting the UMTS system primarily for offering data/multimedia services, when some of these services could not be provided with the same efficiency with, say, a GPRS system.

An alternative scenario of application of the invention is related to managing requests for a data service having characteristic that make it possible to support the service both via a UMTS network and via a WLAN access (for instance, by using a system according to standard known as IEEE 802.11b).

In this latter case, the area covered by the WLAN hot-spot will fall within a wider macro-zone covered by the cells of the UMTS network. Consequently, even in the presence of terminals that are all adapted for dual-mode UMTS and WLAN access, certain cases will exist where it is not possible to allocate the service over the WLAN system whereby the UMTS system must be resorted to by way of necessity due to unavailability of the WLAN access.

Various reasons may exist why the arrangement described herein can be applied in order to give priority or preference to the UMTS system while resorting to the WLAN system only as an alternative, whenever this is possible and suitable. For instance, one may consider that use of the WLAN hot-spot is reserved for specific services different from general services as provided by the UMTS network, namely services devised for WLAN users having a low mobility while being characterised by a required bit rate higher than the maximum bit rate the UMTS system is in a position to provide.

In that case, the WLAN hot-spot can be used for accepting those users that could be served also by the UMTS system only when the number of the users already active on the UMTS system reaches an upper threshold that, if exceeded, may cause the system to refuse access to other users, thereby avoiding congestion conditions.

The procedure described in the foregoing takes into account, via the parameter P of the characteristic of the request reaching the network. In a thoroughly similar way, alternative conditions may be contemplated, while retaining the general principle (which underlies the arrangements described in detail in the foregoing) of taking into account the characteristics of the services request that reach the network over a given time period.

In that respect, the general condition expressed by the step 204 in FIGS. 4 and 5 may be expressed in general terms as: number of active users·f(P)<maximum number of users where f(P) is a generic function of the parameter P.

Of course, the probability parameter P considered in the foregoing has a purely exemplary value. In fact, the invention could easy implemented based on one or more alternative parameters adapted to express the probability that the network receives a request adapted to be allocated exclusively on a system with respect to the whole of the requests that can exploit all the systems available.

In the detailed description provided herein, an exemplary method of evaluating the parameter P during system operation has been provided.

It will be appreciated that alternative criteria exist for estimating the value of the parameter P (or any equivalent parameter as defined previously) during a given time interval. Moreover, the procedures described at a high level via the flowcharts of FIGS. 4 and 5 can be implemented and translated into any programming language adapted for automatic execution by processing equipment, such as microprocessors included in the network devices for common radio resource management. Specifically, the procedures described previously can be implemented in the form of various equivalent software codes by resorting to different numbers of internal variables or using an instruction flow and various principles of comparison different from those specifically described, while leading to essentially equivalent results.

In the detailed description provided in the foregoing, the assumption was made, at least implicitly, that the requests for a service (step 200) come from the users (in the form of "UE originated" request).

Those of skill in the art will promptly appreciate that the same criteria can be applied in the case the network reaches the user to offer a given service (thus giving rise to a so-called "UE terminated" request): the procedures described in the foregoing can be easily applied also for managing this different type of requests.

Performance of the arrangement described herein was evaluated in direct comparison with known alternative arrangements. Special emphasis was placed on evaluating the block probability for the service requested by referring to the typical context of use. Additionally, other evaluations concerned the significance, in terms of possible alternatives, of the threshold proposed in the step 204 of FIGS. 4 and 5 the nearest higher integer of M/(1+P), where M is the total number of the circuits available for voice traffic in a GSM system, while P is the percentage (fraction) of the requests for voice service that can use exclusively the GSM service.

Specific comparisons were made with those procedures that apply an "overflow" principle: in an "overflow" arrangement requests for voice service are allocated on the UMTS network only when the GSM cell has no further resources available. Comparison were also performed with arrangements using a 0 value for the threshold, namely arrangements where the voice calls are allocated on the UMTS system any time corresponding radio resources are available on such system.

More specifically, the following operating scenario was considered:
  users requesting voice service (class of service "Conversational") and users requesting a data service (class of service "Interactive"), with a bit rate equal to 16 Kbps in uplink and 128 Kbps in downlink;
  average duration for the two types of services equal to 120 seconds;
  resources for the GSM cell equal to 20 traffic circuits;

radio resources in the UMTS (UTRAN) cell adapted to support a sensible mixture of the two types of traffic considered in the foregoing in a typical context of use;

intensity of the voice traffic equal to 20 Erlang (which means, in the absence of a block situation, 20 voice users being simultaneously active in the system); and an intensity of the data traffic such as to produce an average value of six data sections simultaneous active in the absence of a block situation.

The results obtained using for the parameter P a value equal to 0.4 (which, for the values considered, corresponds to a threshold value equal to 15) show that the procedure shown in FIG. 5 provides a value for the total block probability very close to the minimum theoretical value.

Both "overflow" and "0 threshold" value arrangements used by way of comparison give much higher values for the block probability for several typical conditions of use of these procedures. This provides evidence of the advantage of allocating on the UMTS those voice calls coming from terminals that can use both GSM and UMTS systems while preserving resources available on the GSM system for those voice calls that—by way of necessity—can only use the GSM system. In principle this would negatively affect the radio resources of the UMTS system whereby, if the value selected for the threshold is too low, the UMTS system is exposed to a high block probability. Consequently, an optimum threshold value exists that minimises the block performance of the system as a whole.

The results obtained show that the procedure of FIG. 5 is generally more efficient than the procedure of FIG. 4 (i.e. a lower block probability for the same threshold value). However, the slightly less efficient procedure shown in FIG. 4 can be advantageously used within a BSC without the need for the RNC to communicate to the BSC the status of the radio resources of the controlled UMTS cells; conversely this is required in the case of the procedure of FIG. 5.

Performance was also analysed in the case where a percentage of the voice service requests that can exploit only the GSM system is different from 40% (which leads to a value for P equal to 0.4).

For instance, values for P equal to 0.3 or 0.5 were considered. Experiments have shown that, if P increases, the advantage (in terms of lower block probability) of considering a threshold lower that the maximum threshold on which the request for voice services are allocated on the UMTS system increases in comparison with the case where request are managed based on an "overflow" principle. In fact, high values for P correspond to a higher percentage of request for voice service that must be allocated by way of necessity on the GSM cell. In order to manage such a condition, it is important to be able to use the radio resources of the GSM cell primarily for that category of request. The experiments show that the advantages related by the use of the arrangement described herein in comparison with an "overflow" arrangement are increasing better as the value for P increases.

Other experiments were carried out by varying the intensities of both the voice traffic and the data traffic by obtaining similar results.

As a whole, experiments show that the results deriving from using the procedures described herein are significantly better of those achieved by using other conventional methods, based only on considering the characteristics of each request for services to be managed at the moment.

Of course, without prejudice for the underlying principles of the invention, the details and the embodiments may vary, also significantly, with respect to what has been described and shown by way of example only, without departing from the scope of invention as defined by the annexed claims.

The invention claimed is:

1. A method for providing in a communication network comprising at least a first and a second set of resources corresponding to a first and a second communication system and having associated controllers, a service to users of at least a first and a second type identified based on capability to operate according to the first and the second communication systems, wherein the users of the first type are in a condition to be provided said service only by means of said first set of resources, while the users of said second type are in a condition to be provided said service both by means of said first set of resources and by means of said second set of resources, the method comprising the steps of:

detecting during at least one time interval, the total number of requests for said service coming from said users, identifying within said total number the fraction of requests adapted to be met only by means of said first set of resources;

identifying at least one parameter representative of said fraction;

receiving a service request from a one user of said second type;

based on the at least one parameter, making a first determination whether to provide or to deny said service to the one user by means of the first set of resources;

if the first determination determines to provide the service to the one user, providing said service to the one user of said second type by means of said first set of resources;

if the first determination determines to deny the service to the one user by means of the first set of resources, making a second determination whether to provide or to deny the service to the one user by means of the second set of resources; and if the second determination determines to provide the service to the one user, providing the service to the one user by means of the second set of resources, and otherwise denying the service to the one user.

2. The method of claim 1, wherein said step of identifying said fraction comprises the step of including within said fraction, requests from users of said second type that cannot be temporarily met by means of said second set of resources.

3. The method of claim 1, wherein said at least a first and a second set of resources correspond to two different cell layers of the same cellular communication system, whereby said first and said second types of users are identified based on coverage by said two different cell layers.

4. The method of claim 1, comprising the step of defining said parameter as the value of said fraction.

5. The method of claim 1, comprising the step of detecting said total number of requests and said fraction over a sequence of time intervals and the step of varying over time the duration of said intervals in said sequence.

6. The method of claim 5, comprising the step of varying the duration of said time intervals over time as a function of said parameter.

7. The method of claim 5, comprising the step of increasing the duration of said time interval with respect to the previous time interval in the sequence if said fraction, as detected during said previous time interval, exceeds an upper threshold.

8. The method of claim 7, comprising the step of selecting said upper threshold as a function of said parameter as identified over said previous time interval.

9. The method of claim 5, comprising the step of decreasing the duration of said time interval with respect to the previous time interval in the sequence if said fraction, as detected during the previous time interval, falls below a lower threshold.

10. The method of claim 9, comprising the step of selecting said lower threshold as a function of said parameter as identified over said previous time interval.

11. The method of claim 5, comprising the step of keeping the length of said time interval constant with respect to a length of the previous time interval in the sequence if said fraction falls between a lower threshold and an upper threshold.

12. The method of claim 11, comprising the step of selecting said lower threshold and said upper threshold as a function of said parameter as identified over said previous time interval.

13. The method of claim 1, wherein making the first determination comprises:
identifying, within at least one portion of said communication network, a maximum number of users in a condition to be provided said service by means of said first set of resources;
detecting a current number of active users being currently provided said service by means of said first set of resources; and
determining to provide said service to said users of said second type by means of said first set of resources if said number of active users increased by a weigh factor as a function of said parameter is lower than said maximum number of users.

14. The method of claim 13, comprising the steps of selecting said weigh factor as 1+P, wherein P is said parameter.

15. The method of claim 13, wherein said communication network is a cellular network and said at least one portion of the communication network is a cell of said cellular network.

16. The method of claim 13, comprising, when said number of currently active users increased by said weigh factor reaches said maximum number of users, the step of checking the availability of resources of said second set of resources for providing said service to said users of the second type by means of said second set of resources.

17. The method of claim 16, comprising the step of providing said service to said users of said second type by means of said second set of resources if said step of checking indicates the availability of said resources of said second set of resources.

18. The method of claim 16, comprising the step of denying the provision of said service to said users of said second type if said step of checking indicates unavailability of said resources of said second set of resources.

19. The method of claim 16, comprising the step of further checking the possibility of providing said service to said user of said second type by means of said first set of resources if said step of checking indicates the unavailability of said resources of said second set of resources.

20. The method of claim 19, comprising the step of providing said service to said users of said second type by means of said first set of resources if said step of checking indicates the unavailability of said resources.

21. A system for providing, in a communication network comprising at least a first and a second set of resources, corresponding to a first and a second communication system and having associated controllers, a service to users of at least a first and a second type identified based on capability to operate according to the first and the second communication systems, wherein the users of the first type are in a condition to be provided said service only by means of said first set of resources, while the users of said second type are in a condition to be provided said service both by means of said first set of resources and by means of said second set of resources, the system comprising:
a detector configured for detecting during at least one time interval, the total number of requests for said service coming from said users, identifying within said total number the fraction of requests adapted to be met only by means of said first set of resources and identifying at least one parameter representative of said fraction; and
a receiver, configured for receiving a service request from a one user of said second type,
the system being configured to make a first determination, based on the at least one parameter, whether to provide or to deny said service to the one user by means of the first set of resources and, if the first determination determines to provide the service to the one user, to provide said service to the one user of the second type by means of said first set of resources,
and the system further being configured, if the first determination determines to deny the service to the one user by means of the first set of resources, to make a second determination whether to provide or to deny the service to the one user by means of the second set of resources, and if the second determination determines to provide the service to the one user, to provide the service to the one user of the second type by means of the second set of resources, and otherwise deny the service to the one user.

22. The system of claim 21, wherein said detector is configured for identifying said fraction by also including within said fraction requests from users of said second type that cannot be temporarily met by means of said second set of resources.

23. The system of claim 21, wherein said at least a first and a second set of resources correspond to two different cell layers of the same cellular communication system, whereby said first and said second types of users are identified based on coverage by said two different cell layers.

24. The system of claim 21, wherein said detector is configured for defining said parameter as the value of said fraction.

25. The system of claim 21, wherein said detector is configured for detecting said total number of requests and said fraction over a sequence of time intervals and for varying over time the duration of said intervals in said sequence.

26. The system of claim 25, wherein said detector is configured for varying the duration of said time intervals over time as a function of said parameter.

27. The system of claim 25, wherein said detector is configured for increasing the duration of said time interval with respect to the previous time interval in the sequence if said fraction, as detected during said previous time interval, exceeds an upper threshold.

28. The system of claim 27, wherein said detector is configured for selecting said upper threshold as a function of said parameter as identified over said previous time interval.

29. The system of claim 25, wherein said detector is configured for decreasing the duration of said time interval with respect to the previous time interval in the sequence if said fraction, as detected during the previous time interval, falls below a lower threshold.

30. The system of claim 29, wherein said detector is configured for selecting said lower threshold as a function of said parameter as identified over said previous time interval.

31. The system of claim 25, wherein said detector is configured for keeping the length of said time interval constant with respect to a length of the previous time interval in the sequence if said fraction falls between a lower threshold and a upper threshold.

32. The system of claim 31, wherein said detector is configured for selecting said lower threshold and said upper threshold as a function of said parameter as identified over said previous time interval.

33. The system of claim 21, wherein making the first determination comprises:
- identifying, within at least one portion of said communication network, a maximum number of users in a condition to be provided said service by means of said first set of resources;
- detecting a current number of active users being currently provided said service by means of said first set of resources; and
- determining to provide said service to said users of said second type by means of said first set of resources if said number of active users increased by a weigh factor as a function of said parameter is lower than said maximum number of users.

34. The system of claim 33, wherein said detector is configured for selecting said weigh factor as 1+P, wherein P is said parameter.

35. The system of claim 33, wherein said communication network is a cellular network and said at least one portion of the communication network is a cell of said cellular network.

36. The system of claim 33, wherein said detector is configured for checking, when said number of currently active users increased by said weigh factor reaches said maximum number of users, the availability of resources of said second set of resources for providing said service to said users of the second type by means of said second set of resources.

37. The system of claim 36, wherein the system is configured for providing said service to said users of said second type by means of said second set of resources if said checking by said detector indicates the availability of said resources of said second set of resources.

38. The system of claim 36, wherein the system is configured for denying the provision of said service to said users of said second type if said step of checking by said detector indicates the unavailability of said resources of said second set of resources.

39. The system of claim 36, wherein the system is configured for further checking the possibility of providing said service to said user of said second type by means of said first set of resources if said step of checking by said detector indicates the unavailability of said resources of said second set of resources.

40. The system of claim 39, wherein the system is configured for providing said service to said users of said second type by means of said first set of resources if said step of checking by said detector indicates the unavailability of said resources.

41. A communication network comprising a system according to claim 21.

42. A non-transitory computer readable medium encoded with a computer program product loadable into a memory of at least one computer, said computer program product comprising software code portions capable of performing the steps of claim 1.

* * * * *